April 8, 1952 D. C. OWENS 2,591,860

CONVEYER BELT SUPPORTING MEANS

Filed July 9, 1949

Inventor
David C. Owens
by M. Talbert Dick
Attorney

Witness
Edward P. Seely

Patented Apr. 8, 1952

2,591,860

UNITED STATES PATENT OFFICE 2,591,860

CONVEYER BELT SUPPORTING MEANS

David C. Owens, Alden, Iowa

Application July 9, 1949, Serial No. 103,771

4 Claims. (Cl. 198—230)

1

Conveyor belts are not new but their advantages are apparent from the many diversified uses to which they are put in the business and industrial field. In operation, there is usually an upper supporting surface for the inner side of the belt while it is conveying the desired item or material and this is generally necessary because the belt itself cannot support any substantial load. However, the underside of the belt, not carrying any load, does not require any continuous support, but it will, of course, sag to some extent if not supported at one or more intermittent points between the end pulleys. There are many types of supports for the lower belt on a conveyor but these are generally satisfactory only at times.

When conveyors are used to move lime, crushed rock, gravel, coal, sand and the like, a good bit of such matter adheres to the belt from time to time so that eventually as the belt continually passes over the end pulleys and intermediate supports, there is danger of the belt becoming damaged from the abrasive action of these foreign particles being continuously pressed between the belt and these supports. This is true because most supports are so shaped as to maintain constant and continuous contact with the belt, such as solid wheel idlers. This obviously causes undue wear on the belt and will materially shorten its useful life, making its replacement necessary much sooner than would be necessary if the belt could be kept clean. In my invention I have overcome these problems by a device, the principal object of which is to provide an open supporting means for a conveyor belt that has a plurality of spaced apart rod members circumferentially arranged at the periphery of two or more spaced apart discs so that some portion of a rod member is always in contact with the belt and thereby providing a continuous even riding support for the belt that causes no continuous slap by the belt due to the contact surfaces of the support being in spaced relation.

A further object of this device is to provide a conveyor belt support that has some portion thereof in continuous engagement with the belt, but which will not press on or compress into the belt any foreign matter thereon.

A still further object of my invention is to provide a supporting means for a conveyor belt that not only functions as a support for the lower portion of the belt but does at the same time provide a means for permitting any foreign matter on the belt to be freed therefrom.

A still further object of this device is to provide a conveyor belt supporting means that is

2 light in weight, economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Figure 1:
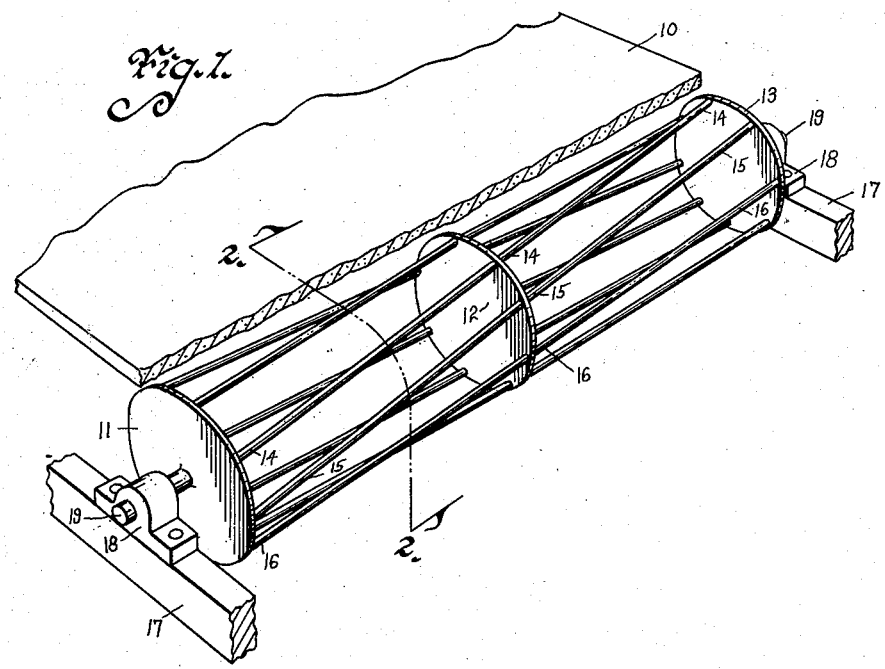
Fig. 1 is a perspective view of this device showing a cut away portion of a belt about to pass over and be supported by it.
Figure 2:
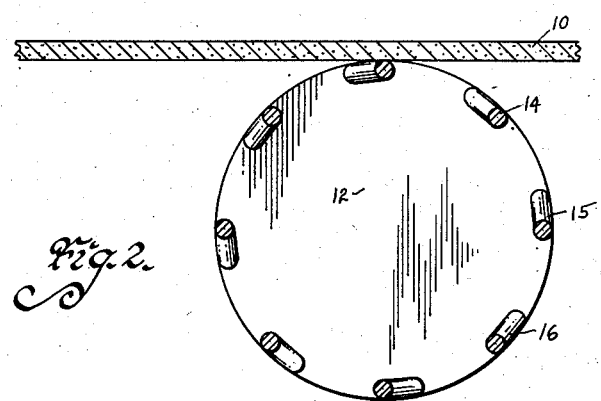
Fig. 2 is a cross-sectional view of this device taken on line 2—2 of Fig. 1 and is shown supporting a belt portion.

Referring to the drawings I have used the numeral 10 to designate an ordinary conveyor belt. The numerals 11, 12 and 13 designate three discs, respectively, arranged in spaced relation, as shown in Fig. 1. A plurality of substantially parallel elongated rod members are arranged circumferentially in spaced relation at and secured in openings provided in the periphery of each of the discs 11, 12 and 13 so as to join the discs together, in a manner resembling an elongated cage having two compartments, as shown in Fig. 1, and for a more complete description of the arrangement of these rods I have used the numerals 14, 15 and 16 to designate three of them.

As stated above, the rod members 14, 15 and 16, as well as the other similar rod members, are in spaced relation and substantially parallel to each other. However, these rod members are arranged diagonally to the longitudinal axis of this device so that the respective ends of each rod member are not diametrically opposite to each other on the respective discs 11, 12 and 13. The rod 14 extends from its position on disc 13 on a diagonal through the periphery of the disc 12 to where it is secured to the periphery in disc 11, as shown in Fig. 1. The rod member 15 extends from its position on disc 13 in the same manner as the rod 14 so that the distance between rods 14 and 15 at the periphery of disc 12 and likewise at the periphery of disc 11 is substantially the same as the distance between rods 14 and 15 on disc 13. The rod 16 and the other rods in succession are arranged in relation as just described for rods 14 and 15. The diagonal at which the respective rod members are arranged is determined by the distance between any two adjacent rods on one of the end discs. This is true because the point on disc 11 where the rod member 14 is secured is diametrically opposite to the point on disc 13 where the rod member 15 is secured. Likewise the point on disc 11 where the rod 15 is secured is diametrically opposite to the point on disc 13 where the rod 16 is secured, and so on in the arrangement of the other rod members. Thus the smaller the distance between any two adjacent rods on the end disc, the less of a diagonal at which the rods are arranged. Likewise, the greater the distance between any two adjacent rods on an end disc, the greater the diagonal at which the rods are arranged.

In my drawing I have shown three discs, but any disc used other than the end ones 11 and 13 are merely for support depending upon the length of the supporting device desired. In other words, a short device constructed as I have described may require no disc 12, while a longer one may need one or more intermediate supporting discs.

The numeral 17 designates a support means for the bearing members 18 and the numeral 19 designates two shaft members. These shaft members 19 are secured to and extend outwardly from the outside center portion of the discs 11 and 13, respectively. These shaft members 19 are rotatably mounted in the bearing member 18, as shown in Fig. 1.

The shaft members 19 are shown illustrated as separate members, one for each disc 11 and 13 but a single shaft extending longitudinally through this device and projecting outwardly from the discs 11 and 13 would serve the same purpose.

This device when constructed as described and mounted for use as shown in Fig. 1, has several distinct advantages. Because of the diagonal at which the rod members are arranged in joining the peripheries of the discs there will always be some portion of a rod member in constant contact with the belt passing over it. This will give a constant support to the belt and will not result in a continuous slapping action by the belt as occurs when a supporting means having other than a solid roller surface is used.

However, this device, while acting as a constant support for the belt will not press foreign matter into the belt but because of the spaced relation of the rods, any foreign matter on the belt such as crushed rock, gravel, coal, sand or the like will drop or fall off due to the pull of gravity. In this action, the construction of my device is such that it will not accumulate or retain such falling matter as some supports do and therefore no special means is required for my device to discharge the same. Instead, any falling foreign matter from the belt merely passes through my supporting means to the floor or ground beneath. Furthermore, by the rods extending diagonally, they exert a shearing and cleaning action on the foreign matter clinging to the belt.

Some changes may be made in the construction and arrangement of my conveyor belt supporting means without departing from the real spirit and purpose of my invention, and it is my intention to cover by my claims, any modified forms of structure or use of mechanical equivalents which may be reasonably included within their scope.

I claim:

1. In combination, a conveyor belt, and a belt supporting means, said belt supporting means comprising, two spaced apart rod supporting members, a means for rotatably supporting said rod supporting members below one of the surfaces of said belt conveyor, and a plurality of rod members having their ends secured to said two rod supporting members respectively and extending diagonally in spaced relationship to provide a substantially cylindrical cage for engagement with and for supporting said conveyor belt.

2. In combination, a belt, and a belt supporting means, said belt supporting means comprising, two spaced apart rod supporting members, a means for rotatably supporting said two rod supporting members, a third rod supporting member spaced apart from and positioned between first two mentioned rod supporting members, a plurality of rod members extending from said third rod supporting member to one of said first rod supporting members and extending on a diagonal to the longitudinal axis of the belt engaging means, and a plurality of rod members extending from the third rod supporting member to the other first mentioned rod supporting members extending on a diagonal to the longitudinal axis of the belt supporting means; said rods forming a cage rotatably engaging said belt.

3. In a conveyor belt supporting device for use with a conveyor belt mounted on a conveyor frame, two spaced apart rod supporting members, means for rotatably mounting said rod supporting members on a conveyor frame, and a plurality of rigid rods having their ends fixed to said rod supporting members and extending diagonally to form a substantially cylindrical cage; said rods having blunt outer surfaces.

4. In a conveyor belt supporting device for use with a conveyor belt mounted on a conveyor frame, a first rod supporting member, a second rod supporting member, a third rod supporting member, means for rotatably mounting at least two of said rod supporting members on a conveyor frame, a plurality of rigid rods having their ends fixed to said first and second rod supporting members respectively and extending diagonally to form a substantially cylindrical cage, and a second plurality of rigid rods having their ends fixed to said third rod supporting member and said second rod supporting member and extending diagonally to form a second substantially cylindrical cage; said substantially cylindrical cages being in longitudinal alignment to each other; said first and second pluralities of rods having blunt outer surfaces.

DAVID C. OWENS.

REFERENCES CITED

The following references are of record in the file of this patent:

UNITED STATES PATENTS

| Number | Name | Date |
|---|---|---|
| 1,793,246 | Philips | Feb. 17, 1931 |
| 1,863,905 | Kuzell | June 21, 1932 |
| 2,312,435 | Nelson | Mar. 2, 1943 |
| 2,391,178 | McKnight | Dec. 18, 1945 |